United States Patent [19]

Smith, III et al.

[11] Patent Number: 5,401,025
[45] Date of Patent: Mar. 28, 1995

[54] REMOTE CONTROL SYSTEM FOR RASTER SCANNED VIDEO DISPLAY

[75] Inventors: Jay Smith, III, Los Angeles; Kenneth J. Curran, Thousand Oaks, both of Calif.

[73] Assignee: Smith Engineering, Los Angeles, Calif.

[21] Appl. No.: 275,109

[22] Filed: Jul. 14, 1994

Related U.S. Application Data

[62] Division of Ser. No. 888,735, May 26, 1992, Pat. No. 5,351,969.

[51] Int. Cl.6 .................................................. A63F 9/00
[52] U.S. Cl. ................... 273/148 B; 273/438; 273/310; 446/473; 345/156
[58] Field of Search ........... 273/433, 434, 438, 148 R, 273/148 B, 310, 311, 312, 313, 316; 345/158, 156; 434/20, 21, 22; 446/405, 406, 473; 362/110, 111, 112, 113, 114; 455/151.1, 347, 348, 349, 603; 358/194.1; D14/218; D21/146, 147; D22/103, 104, 105

[56] References Cited

U.S. PATENT DOCUMENTS

| | | | |
|---|---|---|---|
| 4,205,847 | 6/1980 | Steiger et al. | 273/313 |
| 4,210,329 | 7/1980 | Steiger et al. | 273/313 |
| 4,395,045 | 7/1983 | Baer | 273/312 |
| 4,439,156 | 3/1984 | Marshal et al. | 434/20 X |
| 4,754,133 | 6/1988 | Bleich | 250/221 |
| 4,813,682 | 3/1989 | Okada | 273/312 |
| 4,843,336 | 6/1989 | Kuo | 446/473 X |
| 4,844,475 | 7/1989 | Saffer et al. | 273/311 |
| 4,844,476 | 7/1989 | Becker | 273/312 |
| 4,924,216 | 5/1990 | Leung | 340/709 |
| 4,988,111 | 1/1991 | Gerlizt et al. | 273/310 |
| 5,098,110 | 3/1992 | Yang | 273/438 |
| 5,119,576 | 6/1992 | Ernig | 273/310 X |
| 5,253,068 | 10/1993 | Crook et al. | 358/194 |

*Primary Examiner*—Jessica J. Harrison
*Attorney, Agent, or Firm*—Price, Gess & Ubell

[57] ABSTRACT

The present invention is a remote control targeting and control system for use with a standard raster scanned television and an associated gaming unit. The remote control system includes a mobile transceiver and a fixed transceiver which communicates with the gaming system. The system implements a simple communication system which allows the mobile transceiver to ordinarily transmit position data and to periodically transmit button press data. The mobile transceiver includes an electro-optic detector for observing when a scan line crosses a target area. Each time a scan line is detected, the mobile transceiver transmits a pulse to the fixed unit, based upon which the gaming unit translate the pulse into position data based on the time of its detection. The button press data is transmitted synchronously with the raster scanned television in that the fixed transceiver is caused to transmit a single pulse during each vertical retrace of the television. The preferred remote control system is contained in a gun-shaped main unit of a multipiece housing. A stalk and a sighting system having viewing tubes may be optionally attached to the main unit. The sighting system is comprised of a pair of viewing tubes and a rotatable sighting tube which may be place in front of either sighting tube.

5 Claims, 7 Drawing Sheets

REMOTE CONTROL SYSTEM FOR RASTER SCANNED VIDEO DISPLAY

This is a division of prior application Ser. No. 07/88,735, filed on May 26, 1992, now U.S. Pat. No. 5,351,969.

BACKGROUND OF THE INVENTION

1. Field of the Invention

The present invention relates generally to video input devices and more particularly to a remote aiming/input apparatus comprised of a mobile transceiver and a fixed transceiver for use with a raster scanned video terminal and a gaming unit.

2. Description of Related Art

A standard television is an example of a raster scanned video terminal. An image is formed on a video terminal of this type by using a video signal to control an electron beam which scans across the video terminal, line after line, and frame after frame. The electron beam scans from left to right, and from top to bottom. After the electron beam completes a particular horizontal scan line, the electron beam is blanked and then quickly retraced to the left side to begin the next scan line. After an entire frame has been scanned, the electron beam is blanked and then returned to the upper left corner of the video terminal.

In the video signal, the video data for a single frame is preceded by a vertical blanking pulse and, each scan line of the frame is preceded by a horizontal blanking pulse.

There are known video control systems which determine the position of a target area of a television screen that is focused onto a photosensor contained in a user-controlled aiming unit. The known systems typically operate by measuring the time between the beginning of a new frame (i.e. the vertical blanking pulse) and the photosensor's detection of a horizontal scan line (image data) in the target area. Using appropriate software or firmware, it is a relatively simple matter to translate the time measurement into location data. One such system is the GENESIS 16 BIT MEGA SYSTEM ® and an associated LIGHT PHASER ®, both manufactured by Sega Corporation.

The Sega LIGHT PHASER transmits video data to the GENESIS 16 BIT MEGA SYSTEM via a cable. Thus, a user is somewhat limited in terms of mobility and must always be conscious of the cable.

Other systems have eliminated the cable hook-up and substituted an infrared IR system wherein the user-controlled aiming unit transmits image data to a separate IR receiver which is hard wired to the main video control unit. However, the known systems are complicated and relatively expensive. Typically, such known IR systems send image data and button press data in data blocks which are asynchronous with the television. Such asynchronous data blocks are typically relatively complicated, requiring header data to identify the beginning of a new data block, and dedicated bit positions with regard to the information being transmitted. An expensive microprocessor is typically required in both the user-controlled aiming unit and in the IR receiver in order to accomplish the necessary encoding and decoding of such data blocks.

SUMMARY OF THE PRESENT INVENTION

The present invention is directed to providing a remote control system which resolve the problems associated with the prior art.

In particular, it is an object of the present invention to provide a remote control system that is simple and cost effective to manufacture;

It is a further object of the present invention to provide a remote control system for detecting a target position on a television with high gain;

It is a further object of the present invention to provide a housing for such a remote control system that will maintain the user's interest and be readily adaptable to a variety of game situations; and It is a further object of the present invention to provide a sighting system for such a remote control system that will relieve eye strain.

In accordance with the above objects, a remote control system for use with a raster scanned television and a gaming unit is comprised of a mobile transceiver having user control buttons and a fixed transceiver. The transceivers both include simple transmitters and receptors which, in the preferred embodiment, are comprised of IR diodes. The fixed transceiver is controlled to transmit a pulse synchronously with the vertical retrace of the television. The mobile transceiver only transmits its button press data upon receipt of such retrace pulse.

In the preferred embodiment, the mobile transceiver includes electro-optic circuitry for detecting when a scan line of the television passes through a target area aimed at by the user. The mobile transceiver is ordinarily continuously transmitting a scan line pulse to the fixed transceiver, whereupon the gaming unit may determine the position of the target area based on the timing of the scan line pulses. Upon receipt of a pulse from the fixed transceiver, the mobile transceiver will transmit button press data rather than scan line data.

The electro-optic circuitry preferably includes a two-port phototransistor which is optically biased to a desired gain point with an immediately adjacent LED.

In the preferred embodiment, the mobile transceiver is contained in a multi-piece housing which, to maintain the user's interest in the device and to allow it to be user-configured to various situations, includes a main unit, a stalk, and a sighting system. The main unit is always used as it is the portion which contains the actual circuitry. The stalk and sighting system may be optional added or removed.

The sighting system if preferably comprised of two viewing tubes arranged side-by-side in binocular fashion and a sighting member which may rotatably placed in front of either viewing tube. This arrangement adds further to the user's interest in the device and may relieve eye strain in that the sighting tube may be rotated in front of the user's stronger eye, the user's other eye still being able to see through the other viewing tube.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DESCRIPTION OF THE PREFERRED EMBODIMENT

Figure 1:
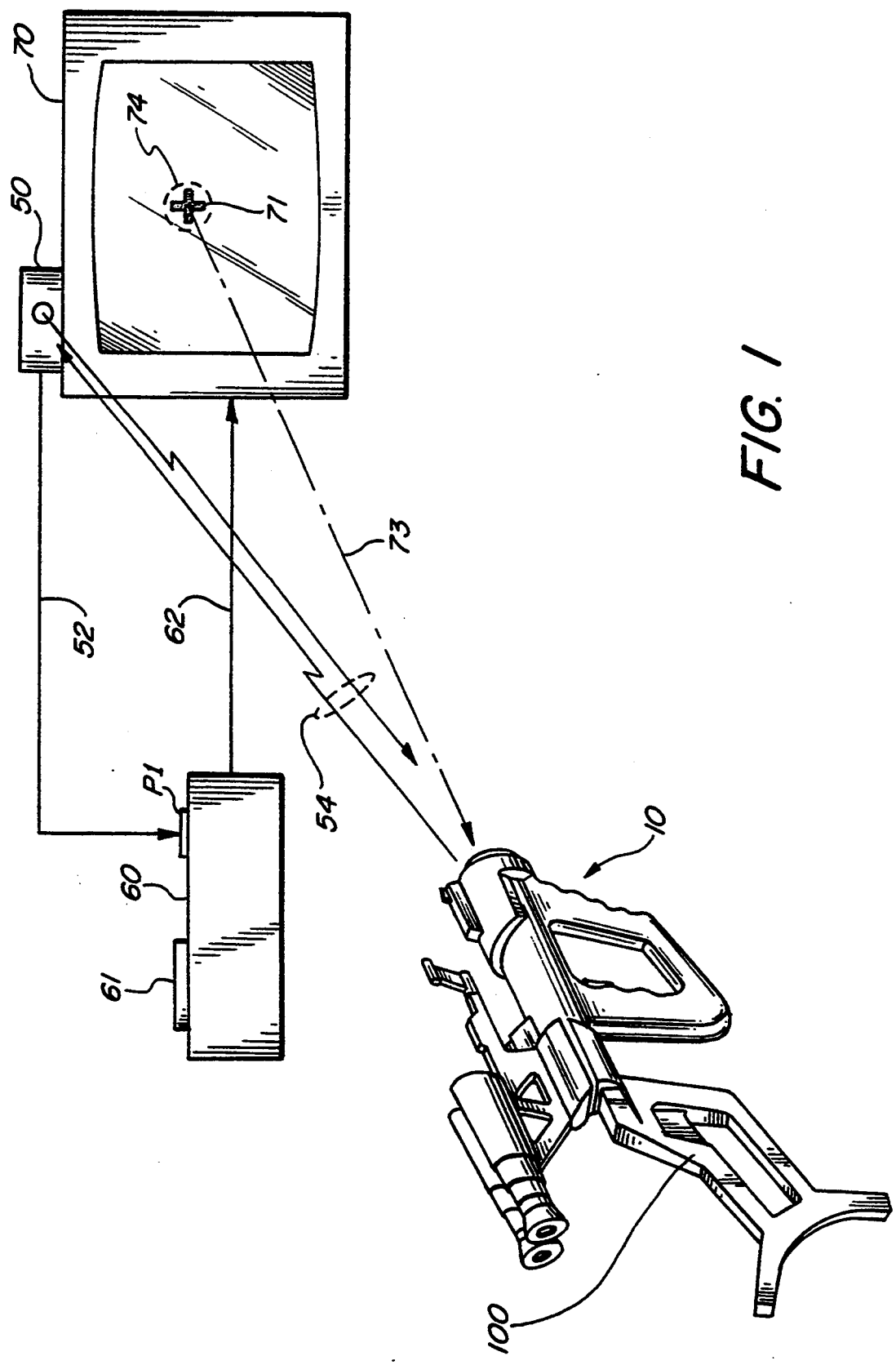
FIG. 1 is an operational diagram of a mobile transceiver 10 and fixed transceiver 50 which collectively comprise a remote control system according to the present invention, and which may be used in conjunction with a television 70 and a gaming unit 60.

As shown in FIG. 1, the preferred embodiment of a remote control system according to the present invention is comprised of a pair of transceivers: a user-directed mobile transceiver 10 (which may or may not be in a gun-shaped housing 100 as shown) and a fixed transceiver 50. The transceivers 10, 50 are used in conjunction with a microprocessor controlled gaming unit 60, such as the Genesis 16 Bit Mega System ® manufactured by Sega Corporation, and a raster scanned video display terminal 70, such as a standard television.

The gaming unit 60, typically under the control of a gaming program contained in a CD Rom 61, or other such storage means, generates a video signal 62 which causes the television 70 to display sequential game images that may be varied as the game progresses and in response to various user inputs. During operation, the user may aim the mobile transceiver 10 at a target area 74 on the television 70, whereby image data 73 contained within the target area 74 is focused onto a sensor device (described later) contained in the mobile transceiver 10 and then communicated the gaming unit 60 via the fixed transceiver 50. The gaming unit 60 is generally connected to the fixed transceiver 50 with a hard link 52. The fixed transceiver 50 provides a two-way wireless communications link 54 between the gaming unit 60 and the mobile transceiver 10, whereby the gaming unit 60 obtains the image data 73 from which it can determine the target location 72. In response to the image data 73, the gaming unit 60 locates the target area 72 and, if desired, modifies the video signal 62 to generate a cursor 71 at the target location 72.

Figure 2:
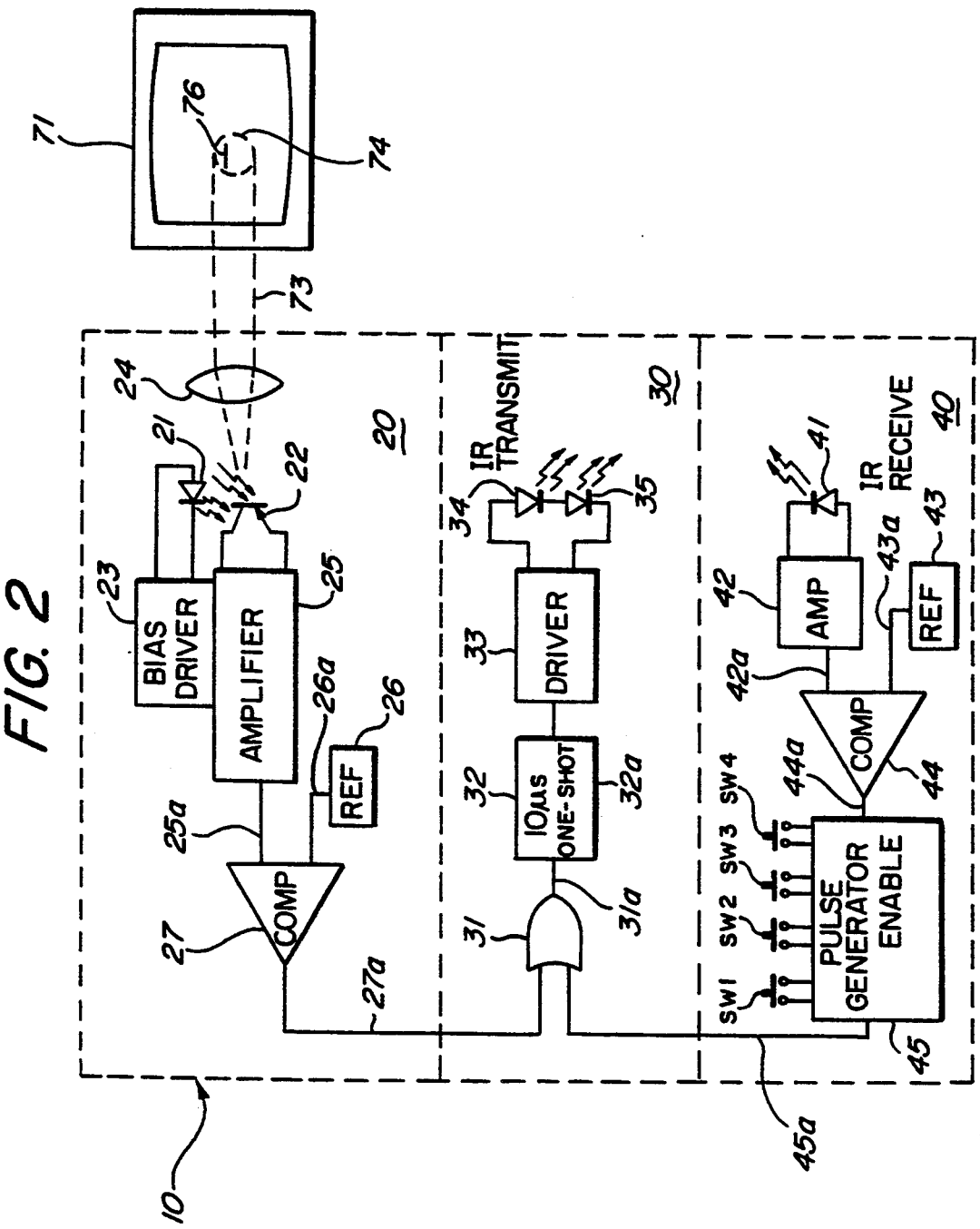
FIG. 2 is a schematic block diagram of the preferred mobile transceiver 10.
Figure 6:
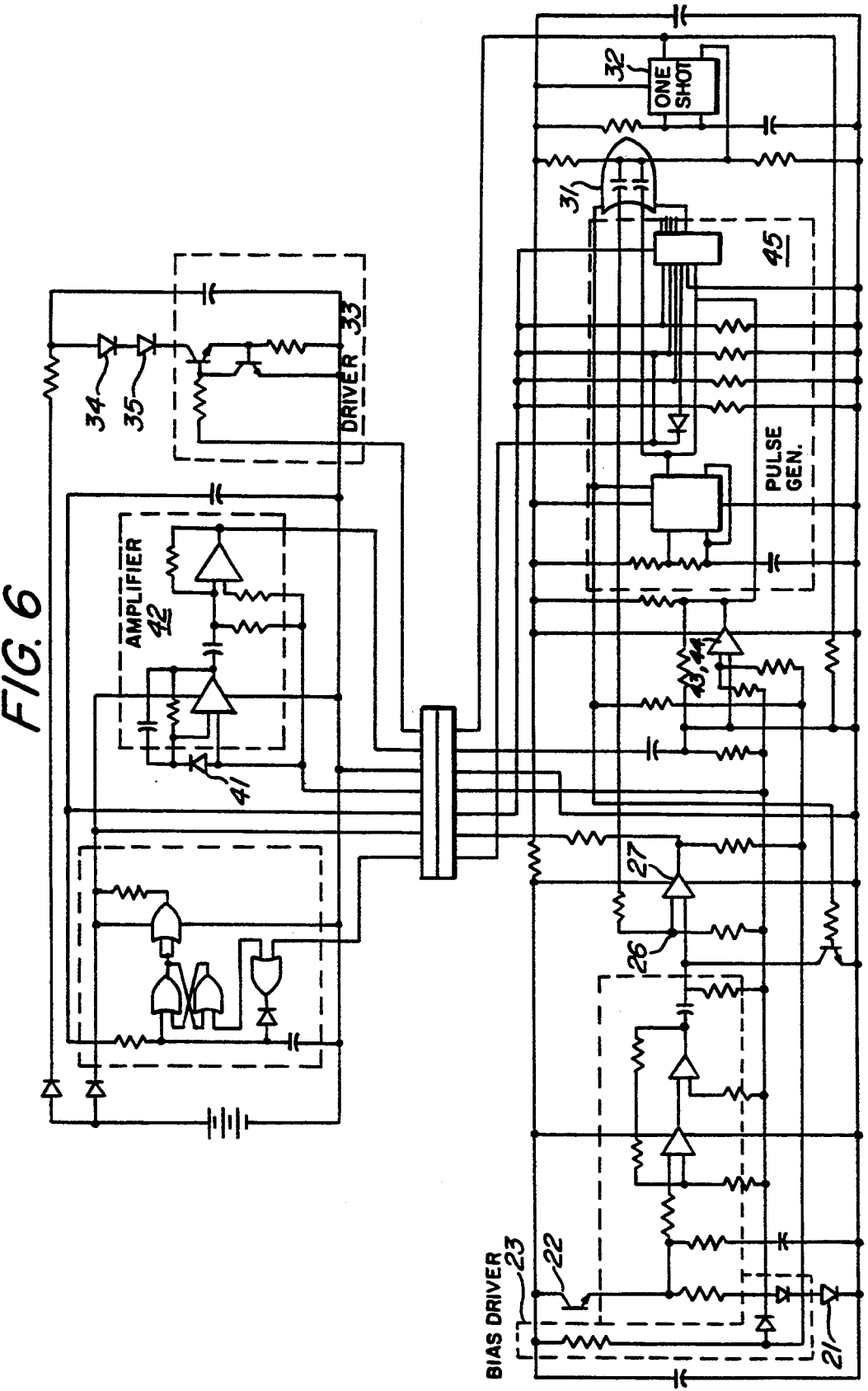
FIG. 6 is a detailed schematic diagram of the preferred circuitry of the mobile transceiver 10, with portions thereof which correspond to the schematic block diagram of FIG. 2 identified as closely as possible.

FIG. 2 is a schematic block diagram of the mobile transceiver 10 shown in FIG. 1. FIG. 6 is an actual schematic of the presently preferred circuitry for implementing the mobile transceiver 10. To the extent possible, portion of the circuitry showing FIG. 6 have been identified as corresponding to the functional blocks of FIG. 2. In view of the functional diagram of FIG. 2, it is not believed necessary to include a blow-by-blow signal level description of the circuit shown in FIG. 6.

As shown in FIG. 2, the circuitry of the mobile transceiver 10 may be conceptually divided into a intermediate IR Transmit Section 40 and two signal generating sections: an upper Target Focusing Section 20 and an IR Receive Section 40.

The upper Target Focusing Section 20 and the lower IR Receive Section 40 are each connected to the IR Transmit Section through an OR gate 31. A pulse received at either input to the OR gate 31 causes a corresponding pulse to be issued at an output 31a. The output 31a of the OR gate 31 is connected to a one-shot 32 which then generates a 10 μsec pulse on its output 32a. A driver 33 illuminates a pair of IR LEDs 34, 35 upon receipt of each one-shot output 32a pulse.

The Target Focusing Section 20 monitors the image data 73 contained with the target area 74 of the television 71. The image data 73 is focused through a lens 24 onto a phototransistor 22 which is sensitive to visible light. Thus, every time a horizontal scan line 76 passes through the target area 74, the phototransistor 22 generates a pulse which is amplified by an amplifier 25 and output as an amplified pulse signal 25a. A circuit 26 generates a reference voltage which is provided as a reference signal 26a. A comparator 27 compares the amplified pulse signal 25a with the reference signal 26a and, whenever the former exceeds the latter, outputs a horizontal scan detection signal 27a to the IR Transmit Section 30.

The Target Focusing Section 20 features an optical biasing LED 21 which, in the preferred embodiment, is physically located immediately adjacent to the phototransistor 22. The gain of the phototransistor 22 is very low at low collector currents (low light). The gain generally increases as the collector current increases. The use of the optical biasing LED 21 allows for the two-terminal phototransistor 22 instead of a standard three-terminal phototransistor having an electrical base drive input. The latter device is undesirable because an attempt to increase gain by biasing the base of the transistormay actually reduce gain. In particular, the resistive network used to electrically bias the device may act as a low impedance shunt for any photocurrent generated by the device. It has been discovered that a sensitivity increase of 10:1 can be obtained with the optical biasing LED 21, as compared to a sensor in darkness.

A bias driver 23 provides the necessary current to drive the biasing led 21 at a current which makes it sufficiently bright. Because the mobile transceiver is powered by batteries (not shown), the drive current provided by the bias driver 23 must be a compromise between brightness and reasonable battery life. At the present time, the preferred bias LED 21 is red in color and is driven at 10 mA. It is supposed that amber or orange LEDs may be preferred over red because of their generally higher quantum efficiencies.

The IR Receive Section 40 outputs button press data 45a to the IR Transmit Section 30 every time an IR pulse is sensed by an IR sensitive diode 41. An output of the diode 41 is enhanced with an amplifier 42. Thus, in response to the diode's receipt of an IR pulse, the amplifier 42 provides an amplified pulse signal 42a. A circuit 43 generates a reference voltage which is provided as a reference signal 43a. A comparator 44 compares the amplified pulse signal 42a with the reference signal 43a and, whenever the former exceeds the latter, outputs an IR pulse detection signal 44a to an enable input of a pulse generator 45. Each time the pulse generator 45 receives a pulse at its enable input, it provides the button-press data 45a to the IR Transmit Section 30.

In the preferred embodiment, the IR Receive Section 40 operates with four switches SW1, SW2, SW3, and SW4. The button-press data 45a is preferably comprised of a variable string of pulses, the number of pulses based on which one or more of the switches SW1, SW2, SW3, SW4 was depressed at the time an IR pulse was sensed by the diode 41.

The following table identifies a preferred encoding system wherein SW1 is identified by one pulse, SW2 is identified by two pulses, SW3 is identified by four pulses, and SW4 is identified by eight pulses. If two or more of the switches was pressed, then the number of pulses generated by the pulse generator 45 is equal to the sum of the foregoing pulses. On the basis of this encoding system, each series of between 0 and 15 pulses uniquely identifies each possible combination of the four switches SW1, SW2, SW3, SW4 as follows:

| No. of pulses | Switches Depressed | | | |
| --- | --- | --- | --- | --- |
| 0 | none | | | |
| 1 | | | | SW1 |
| 2 | | | SW2 | |
| 3 | | | SW2 | SW1 |
| 4 | | SW3 | | |
| 5 | | | SW2 | SW1 |
| 6 | | SW3 | SW2 | |
| 7 | | SW3 | SW2 | SW1 |
| 8 | SW4 | | | |
| 9 | SW4 | | | SW1 |
| 10 | SW4 | | SW2 | |
| 11 | SW4 | | SW2 | SW1 |
| 12 | SW4 | SW3 | | |
| 13 | SW4 | SW3 | | SW1 |
| 14 | SW4 | SW3 | SW2 | |
| 15 | SW4 | SW3 | SW2 | SW1 |

Figure 3:
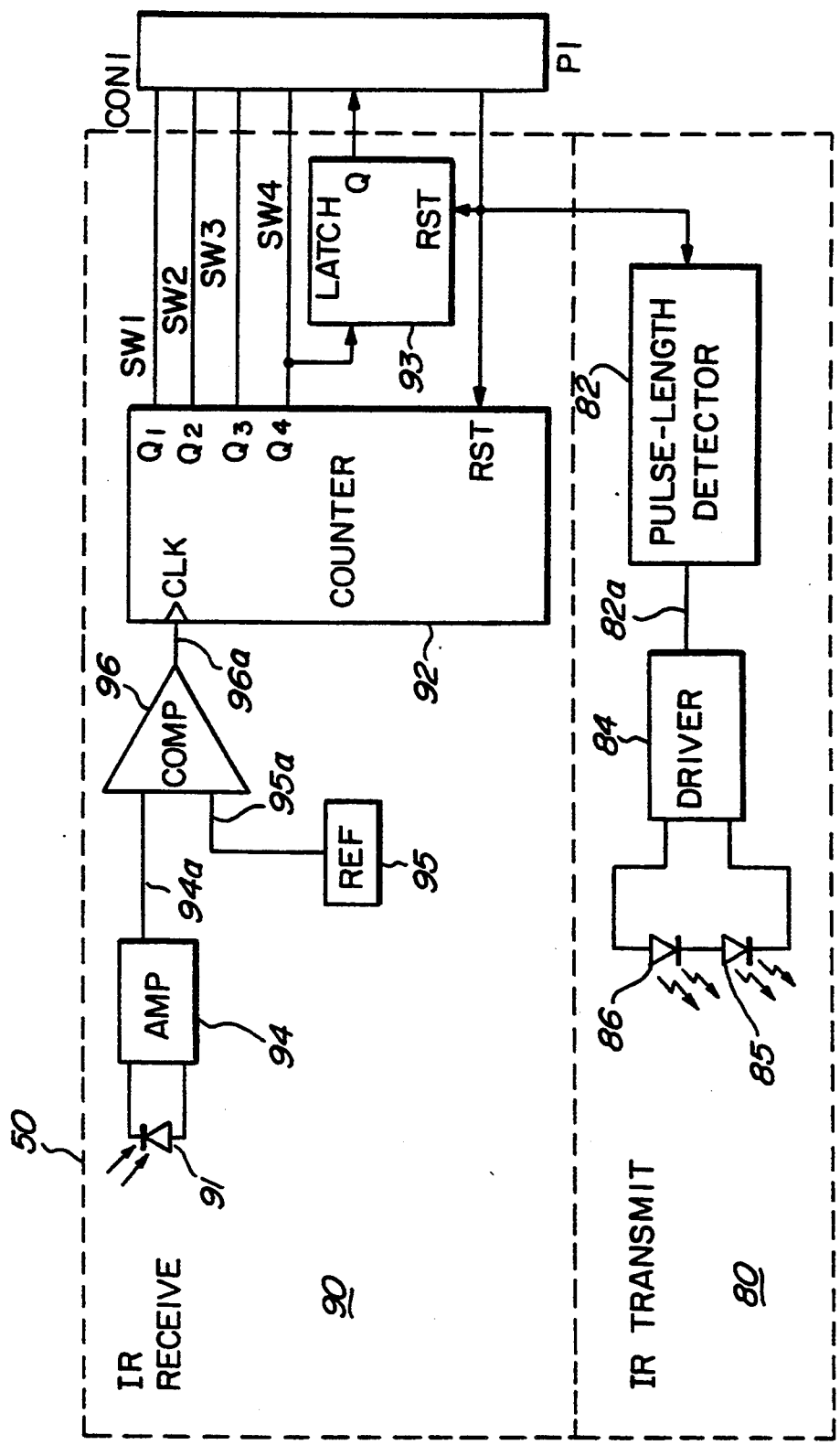
FIG. 3 is a schematic block diagram of the preferred fixed transceiver 50.
Figure 7:
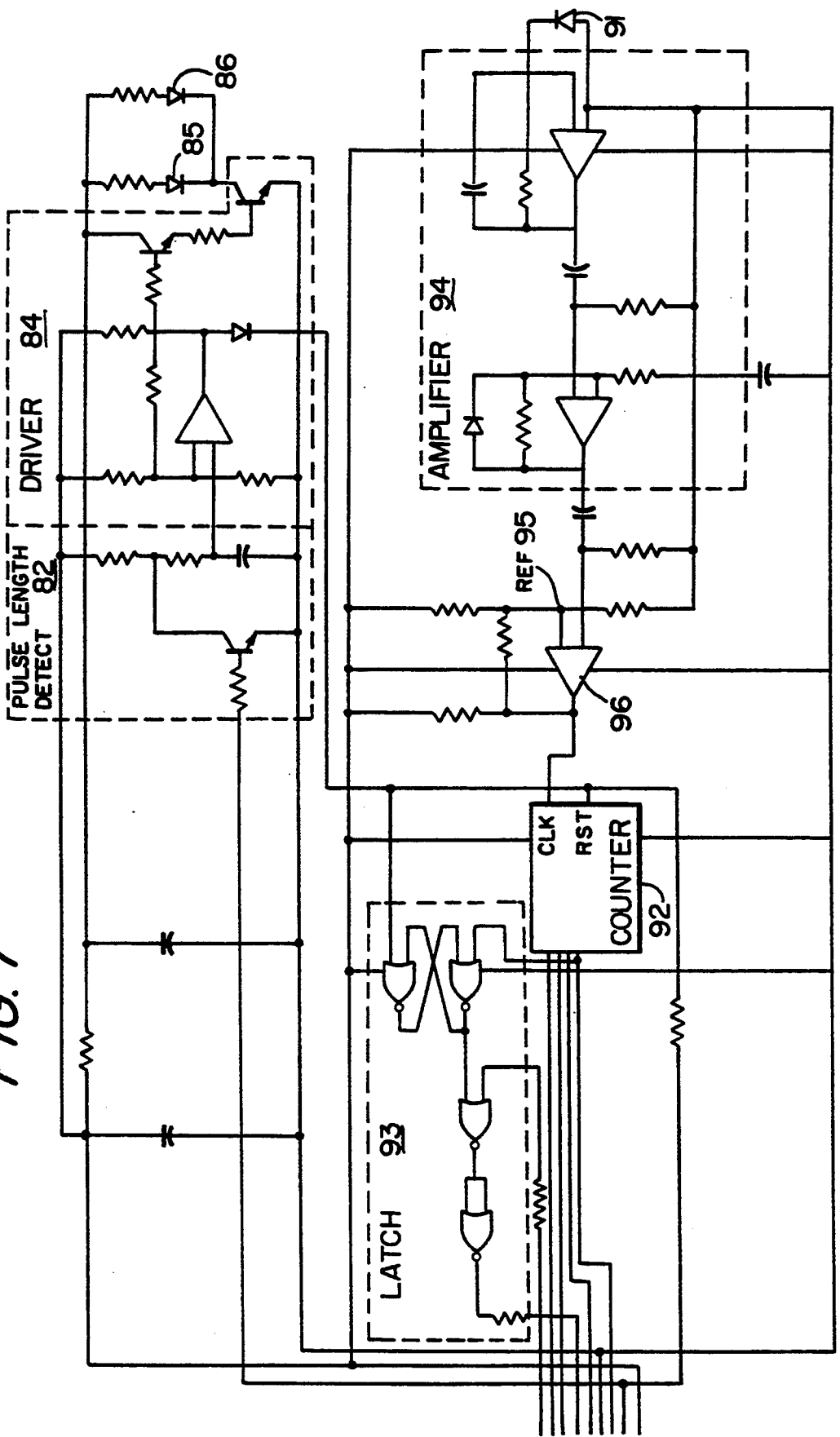
FIG. 7 is a detailed schematic diagram of the preferred circuitry of the fixed transceiver 50, with portions thereof which correspond to the schematic block diagram of FIG. 3 identified as closely as possible.

FIG. 3 depicts a functional block diagram of the fixed transceiver 50 and FIG. 7 is an actual schematic of the presently preferred circuitry for implementing the same. To the extent possible, portion of the circuitry showing FIG. 7 have been identified as corresponding to the functional blocks of FIG. 3. In view of the functional diagram of FIG. 3, it is not believed necessary to include a blow-by-blow signal level description of the circuit shown in FIG. 7.

Like schematic diagram of the mobile transceiver 10 shown in FIG. 2, the diagram of the fixed transceiver 50 shown in FIG. 3 may also be conceptually divided, but in this case into only two sections: an IR transmit section 80 and an IR Receive Section 90. As shown in FIG. 1, the fixed transceiver 50 is connected to the gaming Unit 60 via the connector plug P1 and the cable 52. The gaming unit 60, under the control of appropriate software, receives data from the fixed transceiver 50 and controls its operation.

The fixed transceiver's IR Transmit and Receive Sections 80, 90 respectively "talk" and "listen" to the conversely named IR Receive and Transmit Sections 40, 30 of the mobile transceiver. In the preferred embodiment, both transmission protocols are relatively simple, i.e. pulses of fixed duration.

The gaming unit 60 controls the operation of the fixed transceiver 50 with a variable length reset signal RST. As shown in FIG. 3., the reset signal RST is provided to a counter 92 and a latch 93 in the IR Receive Section 90 and to a pulse length detector 82 in the IR Transmit Section 80.

In the preferred embodiment, the reset signal RST has only two different lengths: a counter reset signal which is between 2-3 μsec long and a main reset signal which is about 10 μsec long. The counter reset signal is issued after the counter data (switch data) is read at the end of the vertical blanking interval. The main reset signal is issued once at the beginning of each vertical retrace, i.e. 60 times per second at the beginning of each television frame. During the vertical blanking interval, no scan lines are present. Thus, the receiver may differentiate between the data from the button encoder and the visible scan line pulses. Switch data is generated during the vertical blanking interval and, therefore, there can be no scan lines present. To do this, a sync signal is provided at the beginning of the vertical retrace interval, and the mobile transceiver sends switch data. The game unit then reads the counter of the fixed transceiver at the end of the vertical interval, before any scan lines are generated. The game unit then resets the counter (without generating an IR sync pulse) and waits for scan lines to appear in the field of view.

The IR Receive Section 90 is comprised of an IR sensitive LED 91 which is connected across an amplifier 94. In response to the detection of an IR pulse by the diode 91, the amplifier 94 provides an amplified pulse signal 94a. A comparator 44 compares the amplified pulse signal 94a with a reference signal 95a provided by a circuit 95. The output 96a of the comparator is provided as a clock CLK input to a counter 92 configured as an up counter.

Thus, for each horizontal scan line 76 crossing the target area 71 and the corresponding IR pulse detected by diode 91, the counter 92 counts up, with its outputs Q1, Q2, Q3, Q4 going successively from 0000 to 1111. Of all the scan lines which cross the target area, the central most scan line will provide the longest and highest intensity pulse, which will provide the least amount of timing variation from frame to frame. On average, when the preferred mobile transceiver 10 is about ten feet away from a 21" television, the target area 74 encompasses about 20 scan lines. Thus, when the count reaches 8, i.e. when Q4 goes high to provide binary 8 (1000), then latch 93 is set and provides a scan line detection signal to the gaming unit 60 until it receives the reset signal RST. In order to accommodate other screen sites, other counts may be used.

In the IR Transmit Section 80, the pulse length detector 82 ignores the shorter counter reset signal, but, in response to a longer main reset signal outputs a reset detection signal 82a to a driver 84, which in turn pulses a pair of IR LEDs 85, 86. The IR pulse may be referred to as a vertical retrace pulse in that the IR LEDs 85, 86 are triggered at the beginning of each vertical retrace. The transmission of the vertical retrace pulse is the signal for the mobile transceiver 10 to send button-press data, if any.

The communication between the two transceivers can be summarized as follows. The mobile transceiver continuously transmits image position data comprised of a single pulse each time a horizontal scan line 76 through the target area 74 and, immediately after having received a vertical retrace pulse from the fixed transceiver, transmits button-press data comprised of between 0 and 15 pulses depending on the number of buttons currently pressed by the user, if any.

Figure 4:
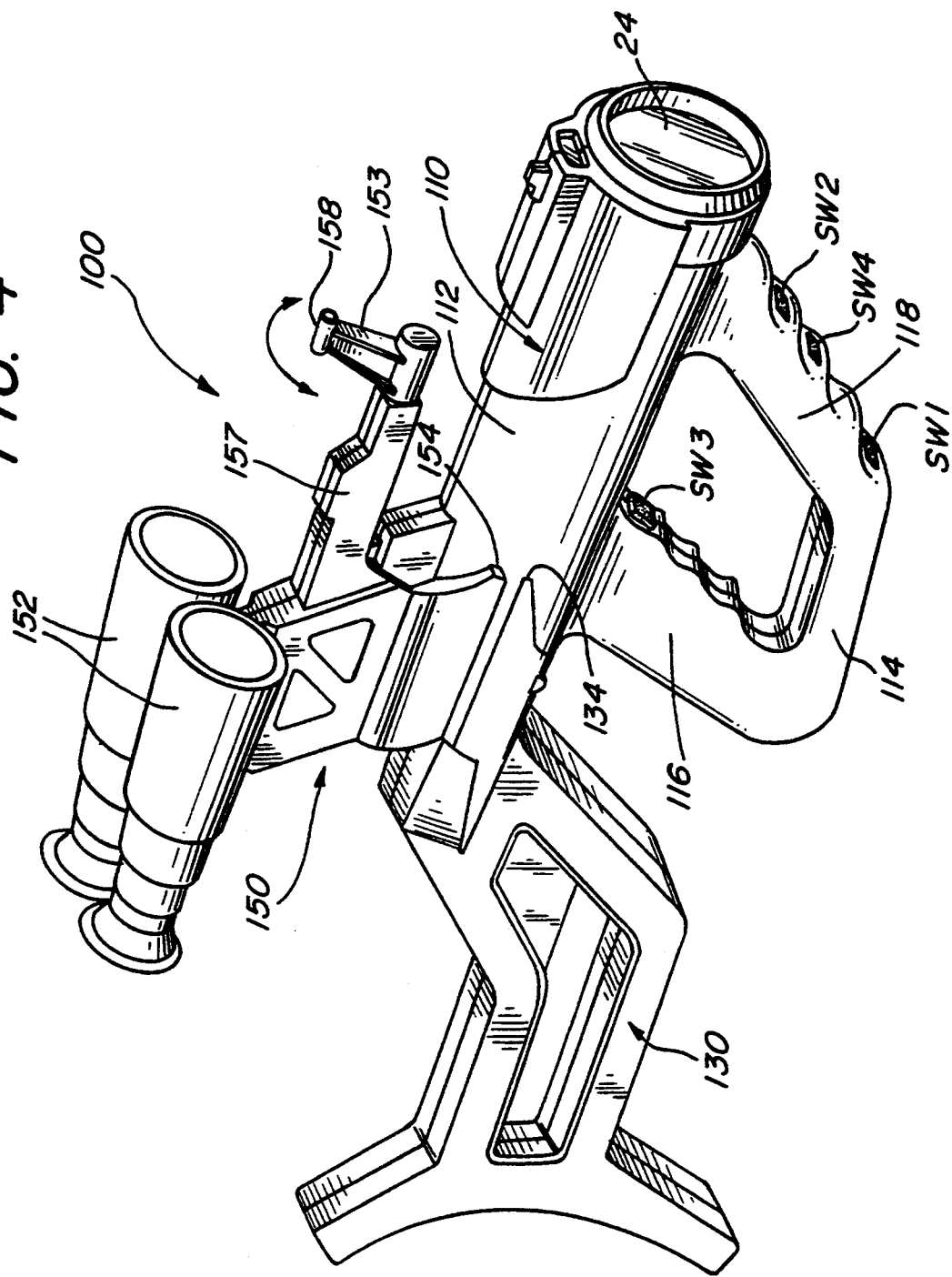
FIG. 4 is a perspective view of a preferred multipiece housing 100 for the mobile transceiver of FIG. 1.
Figure 5:
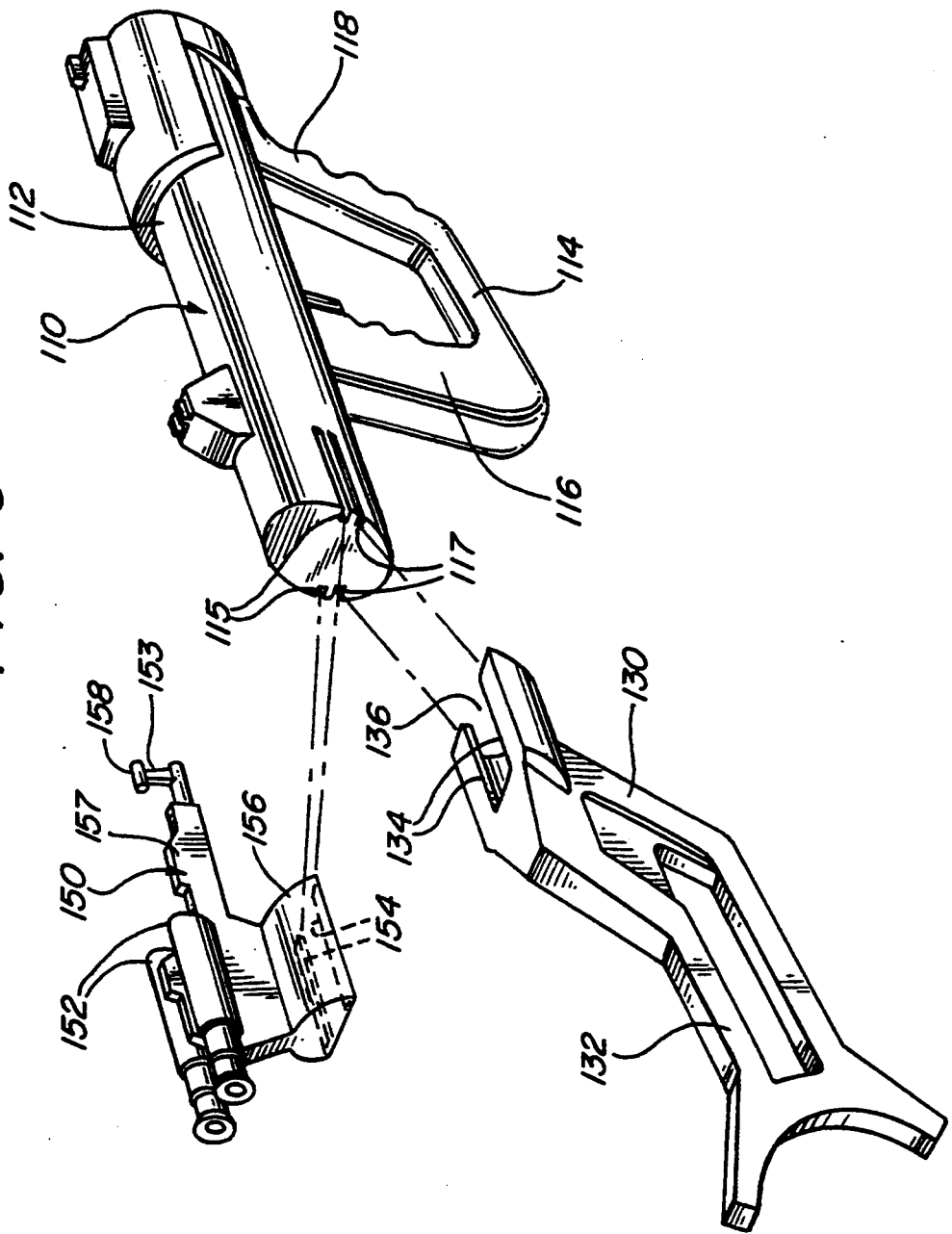
FIG. 5 is an exploded view of the multipiece housing 100 of FIG. 4.

FIGS. 4 and 5 are respectively a perspective view and an exploded view of a preferred multipiece gun-shaped housing 100 for the mobile transceiver 10. As best shown in FIG. 5, the housing 100 is comprised of three main components, separable from one another: a main body 110, a stalk 130, and a sighting system 150.

The main body 110 is comprised of a tube portion 112, a U-shaped grip 114 having a front member 118 and a rear member 116. The main body 110 actually houses the circuitry for the mobile transceiver shown in FIG. 2. The lens 24 which focuses the target area 74 onto the phototransistor 22 is located at a front end of the tube portion 112 as shown in FIG. 5.

As best shown in FIG. 4, the four switches SW1, SW2, SW3, SW4 are exposed on the exterior of the main body 110. One switch SW2 serves as the "Fire" switch and is positioned on the rear member 116 for activation by the user's index finger. The other three switches SW1, SW3, SW4 are located on the front member 118 for activation by the fingers of the user's other hand. Thus, the mobile transceiver 10 and housing 100 can serve not only as a targeting device ("Fire" button only), but also as a multibutton controller, with or without a visible cursor.

The tube portion 112 of the preferred main body 110 also includes two adjacent pairs of slots, an upper pair of slots 115, and a lower pair of slots 117. As suggested by the dashed lines in FIG. 5, the upper pair of slots 115 receive the sighting system 150 and the lower pair of slots receive the stalk 130.

The stalk 130 is comprised of a body portion 132 and a pair of opposed inwardly-extending tabs 134 which surround a hollow portion 136. The sighting system is likewise comprised of a pair of opposed inwardly-extending tabs 154 which surround a hollow portion 156. The inwardly extending tabs 154, 134 respectively engage the upper and lower pairs of slots 115, 117 at the rear of the main body 110.

By this novel arrangement, the user is provided with a versatile easily-modified housing 100 for the mobile transceiver 10. With all three components 110, 130, 150 connected to one another, the user has a rifle-like housing 100 with a sighting system 130. Under certain conditions, the user may prefer to use just the main body 110 and the stalk 130. Under even other conditions, the user may use just the main body 110 in a pistol-like fashion.

The sighting system 150 is further comprised of a pair of viewing tubes 152 which appear like binoculars. In the preferred embodiment, the viewing tubes 152 do not contain any optics, but simply are configured with an interior transverse wall having a small hole through which the user may look. A rotatable member 153 having a hollow sight tube 158 is provided at a front end of a member 157 which extends forward of the viewing tubes 152. The hollow sight tube 158 may be rotated in front of a desired one of the viewing tubes 152. The user would ordinarily rotated the hollow sight tube 158 in front of the viewing tube 152 serving the user's strongest eye (i.e., the dominant eye).

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

We claim:

1. A multipiece user-configurable housing for a remote control transmitter comprising:
   a main unit having a tube portion for housing a circuit of said remote control transmitter and a handle means for supporting said tube portion in a grip of a user and including at least one user-operable button thereon, said tube portion including an upper and lower pair of opposed slots at a rear end thereof;
   a stalk including a first pair of inwardly extending tabs, said first tabs slidably engaging said lower pair of opposed slots of said tube portion whereby said stalk may be selectably mounted on the tube portion of said main body as desired; and
   a sighting system including at least one viewing tube and a second pair of inwardly extending tabs, said second tabs slidably engaging said upper pair of opposed slots of said tube portion whereby said sighting system may be selectably mounted on the tube portion of said main body as desired.

2. The multipiece user-configurable housing of claim 1 wherein the at least one viewing tube of said sighting system is comprised of two viewing tubes located horizontally adjacent to one another in a binocular fashion.

3. The multipiece user-configurable housing of claim 2 wherein said sighting system is further comprised of a member extending forward of the two viewing tubes, a rotatable member rotatably attached to and extending substantially perpendicularly from the member, and a hollow sight tube located at a distal end of rotatable member, whereby the user may rotated the hollow sight tube in front of a desired one of the two viewing tubes.

4. The multipiece user-configurable housing of claim 1 wherein the handle means of said main unit is comprised of a U-shaped grip extending beneath the tube portion, the U-shaped grip having a front end for accommodating the user's one hand and a back end for accommodating the user's other hand.

5. The multipiece user-configurable housing of claim 4 wherein the back end of the U-shaped grip contains a "fire" button and wherein the front end of the U-shaped grip contains at least one other button.

* * * * *